(No Model.)

6 Sheets—Sheet 1.

G. J. DOLLINER.
VENDING MACHINE.

No. 402,008. Patented Apr. 23, 1889.

Witnesses:
James F. Duhamel
Horace A. Dodge

Inventor:
Gustav J. Dolliner,
by Dodge Sons
Atty.

(No Model.) 6 Sheets—Sheet 2.
G. J. DOLLINER.
VENDING MACHINE.
No. 402,008. Patented Apr. 23, 1889.
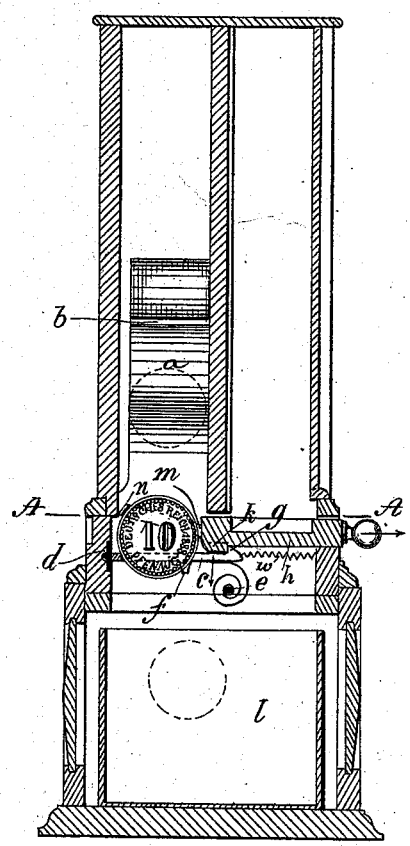
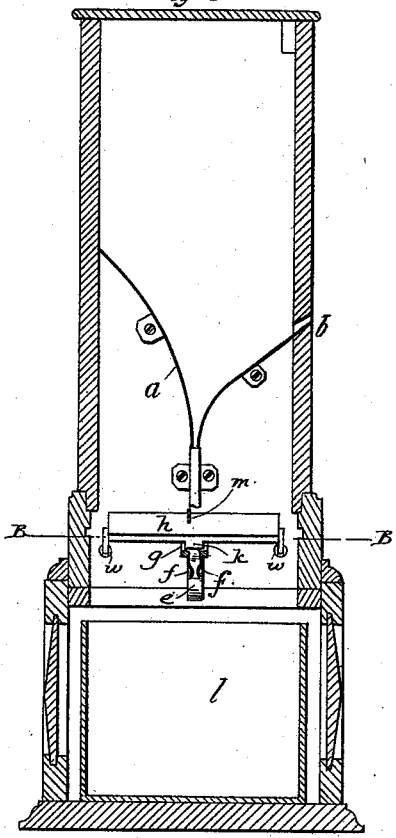
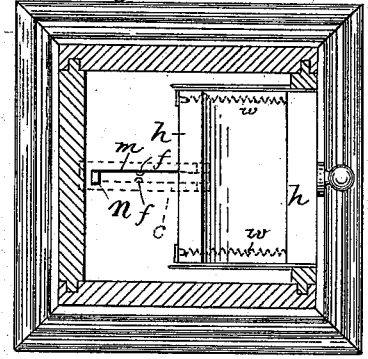
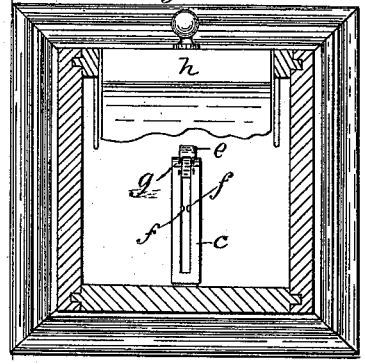
Witnesses:
James F. DeHamel
Horace A. Dodge.
Inventor.
Gustav J. Dolliner,
by Dodger Sons
attys (No Model.)  6 Sheets—Sheet 3.

G. J. DOLLINER.
VENDING MACHINE.

No. 402,008. Patented Apr. 23, 1889.

Witnesses:
James F. DuHamel.
Horace A. Dodge.

Inventor:
Gustav J. Dolliner,
by Dodge Sons
Attys.

(No Model.)

6 Sheets—Sheet 4.

G. J. DOLLINER.
VENDING MACHINE.

No. 402,008.

Patented Apr. 23, 1889.

Witnesses:
James F. DuHamel
Horace A. Dodge.

Inventor:
Gustav J. Dolliner,
by Dodge Sons
Attys.

(No Model.) 6 Sheets—Sheet 5.

G. J. DOLLINER.
VENDING MACHINE.

No. 402,008. Patented Apr. 23, 1889.

Witnesses:
James F. DuHamel.
Horace A. Dodge.

Inventor:
Gustav J. Dolliner,
by Dodge Sons
Attys.

(No Model.) 6 Sheets—Sheet 6.

G. J. DOLLINER
VENDING MACHINE.

No. 402,008. Patented Apr. 23, 1889.

UNITED STATES PATENT OFFICE.

GUSTAV JOSEF DOLLINER, OF HAMBURG, GERMANY, ASSIGNOR TO JOSEF STEINDECKER, OF SAME PLACE.

VENDING-MACHINE.

SPECIFICATION forming part of Letters Patent No. 402,008, dated April 23, 1889.

Application filed November 28, 1888. Serial No. 292,070. (No model.)

*To all whom it may concern:*

Be it known that I, GUSTAV JOSEF DOLLINER, of Hamburg, in the Free State of Hamburg, Germany, have invented new and useful Improvements in Vending-Machines, of which the following is a specification, reference being had therein to the accompanying drawings.

This invention relates to apparatus for the automatic sale and delivery of goods.

Figure 1:
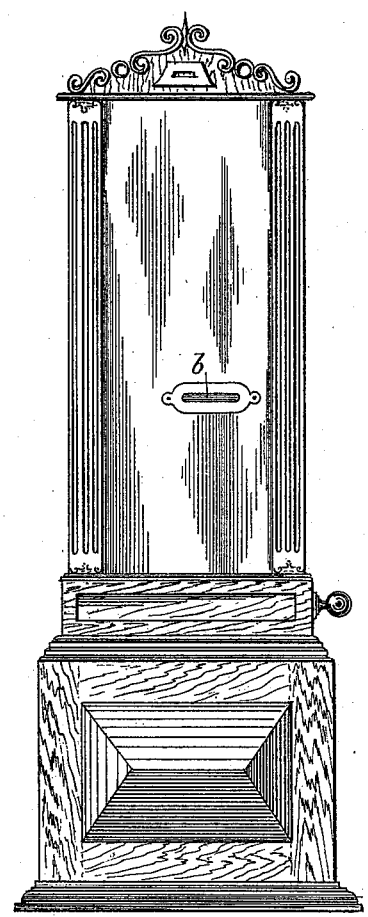
Figure 6:
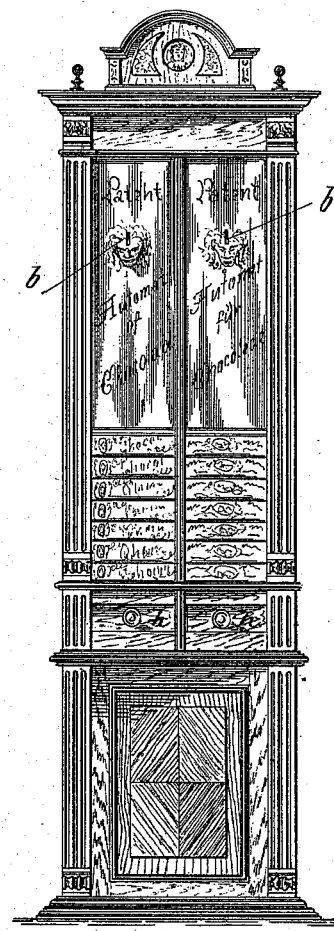
Figure 7:
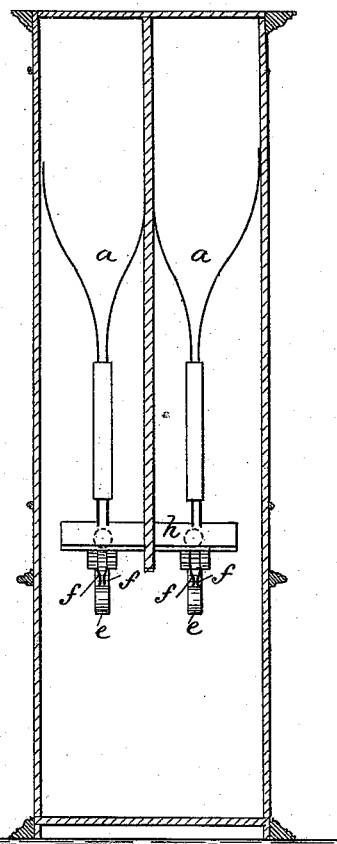

In the accompanying drawings, Figure 1 is a side view of my machine; Fig. 2, a vertical sectional view from front to rear; Fig. 3, a similar sectional view at right angles to Fig. 2; Fig. 4, a sectional view on the line A A of Fig. 2; Fig. 5, a sectional view on the line B B of Fig. 3; Fig. 6, a face view of a double machine constructed in accordance with my invention; Fig. 7, a sectional view of the same; and Figs. 8, 9, and 10 sectional views illustrating a slight modification of the delivering device, Fig. 10 being a sectional view on the line 6 6 of Fig. 9.

The coin inserted into the apparatus drops upon a pivoted lever, which is provided with flat springs that serve to hold the coin in the first instance. By the increased load on the lever the latter is somewhat lowered, whereby the slide or delivery appliance is released. By pulling out the latter or depressing a knob the coin is pressed through the flat springs and the article delivered.

Referring first to Figs. 1 to 7, the coin inserted through the slot $b$ to the hopper $a$ drops into the lever $c$, which is slotted according to the thickness and diameter of the coin. The lever $c$ is hinged to the case at one end, as at $d$, and supported directly below the hopper $a$ with the slot in line with the mouth of the latter by a spring, $e$. Lever $c$ is provided on its under side with two flat spring-arms, $f f$, which, projecting inward toward each other, clasp the coin projecting through the slot and prevent its falling, except when released by means hereinafter referred to. The front end of the lever $c$ is provided with a hook or catch, $g$. The delivering slide or drawer $h$, for containing the separate article to be delivered, has on its under side a hook or catch, $k$, behind which the hook $g$ of lever $c$ takes, so as to normally hold the slide $h$ in its locked position when no coin is dropped into the apparatus and resting on the lever $c$; but the hook $k$ on the slide $h$ will be released so that the latter can be drawn out when a coin of the determined weight and size rests in or on the lever $c$, (being nipped by the two springs $f$,) the thus loaded lever then dropping sufficiently to cause the aforesaid release of the hook $k$ and slide $h$.

In order that the pulling out or actuation of the delivery-slide shall cause the coin to drop down out of the nip of the springs $f$ and into the coin-receptacle $l$, the back of the slide $h$ is provided with an arm, $m$, the hook-formed end $n$ of which in the closed position of the slide $h$ is against the back of the hopper $a$, and permits the coin to drop onto the lever $c$; but when the slide $h$ is drawn out the hook $n$ comes against the back edge of the coin, and, assisted by the weight of the latter, forces it down from between the springs $f$, and causes it to drop into the coin-receptacle $l$. At the same time the hook $n$ also obstructs the passage or throat of the hopper $a$ and prevents any other coin from passing down until the slide $h$ is pushed back and the hooks $k$ and $g$ made to catch into each other.

In the double apparatus Figs. 6 and 7 are shown two such mechanisms arranged in one apparatus.

Figure 8:
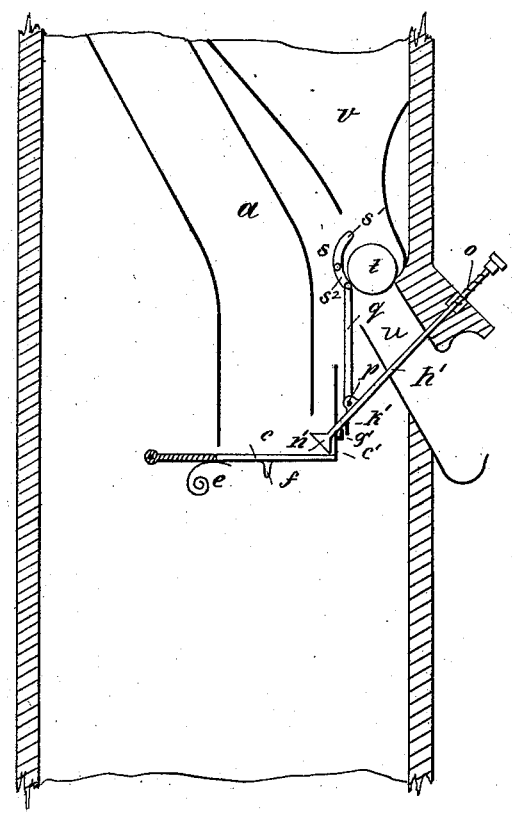
Figure 9:
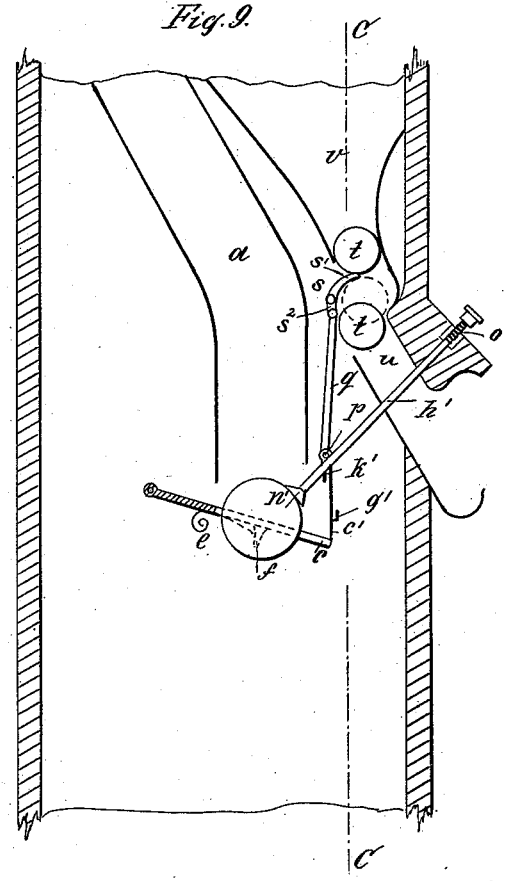
Figure 10:
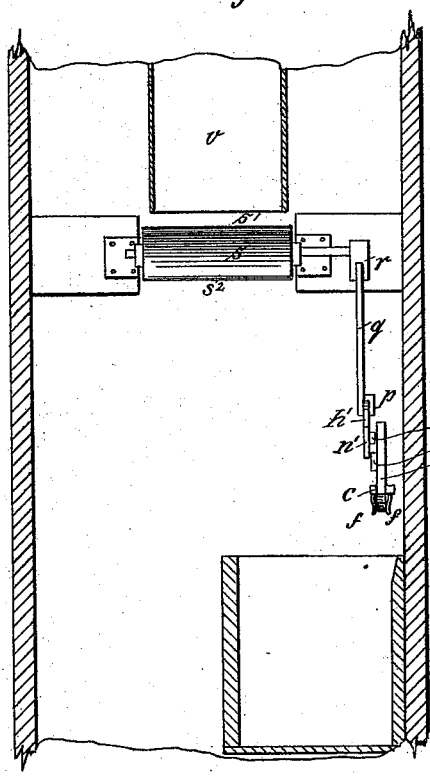

The apparatus Figs. 8 to 10 is modified so far that the loading of the lever $c$ (also provided with coin-nipping springs $f$) with a coin of suitable weight and size releases the delivery appliance, and a round article—such, for instance, as a cigar or cigarette—falls into a delivery-gutter. The lever $c$ is in this case bent up at the end, as at $c'$, and has there a catch or projection, $g'$, which normally lies behind a catch or projection, $k'$, on the pusher $h'$, so that when the lever $c$ is not loaded the pusher $h'$ cannot be depressed, as the lugs or projections $g'$ $k'$ on the lever and pusher, respectively, will strike one against the other and prevent such a movement of the pusher as would be necessary to depress the lever to the required degree. The pusher $h'$ is normally held up by a helical spring, $o$, and is at $p$ jointed to a rod, $q$, the other end of which is jointed to a lever, r, on the oscillating scoop s. This latter is so placed relatively to the side wall of the supply-hopper v that in the normal position, Fig. 8, of the mechanism the lower end, $s^2$, of the scoop prevents the article of sale—such as a cigarette, t—from falling into the outlet-passage u, the latter being then narrowed in this place; but when the lever c is loaded with the coin the catch $g'$ releases the catch $k'$ on the pusher $h'$, so that the latter can be depressed, whereby the scoop s assumes the position shown in Fig. 9, in which the lower end, $s^2$, of the scoop releases the article of sale, t, while its upper end, $s'$, at the same time stops the passage from the supply-hopper v of the next following article of sale, t. Thus only one article is delivered at a time.

By the depression of the pusher $h'$ the end $n'$ of same will force the coin down from between the nipping-springs f of the lever c, so that it drops into the receptacle l. The spring o then pulls the pusher $h'$ back again, and by this movement of the pusher, acting through a rod, q, the passage v is again narrowed by turning the scoop s into the position shown in Fig. 8, so that another article of sale, t, comes against the lower end, $s^2$, of the scoop, and the catch $g'$ again comes against the catch $k'$ of the pusher $h'$, as shown in Fig. 8. The delivery-slide is returned to its normal position by springs w w.

I am aware that a vending apparatus has been provided with a pivoted lever adapted to engage with the delivering device to prevent its being actuated until a coin of the requisite weight is inserted, which coin is adapted to overcome the resistance of a spring and to throw the lever out of engagement with the delivering-slide, and to such a combination I make no broad claim.

What I claim, and desire to secure by Letters Patent of the United States, is—

1. In a vending-machine, the combination, with a casing and a coin-hopper, of a slotted lever adapted to receive and hold the coin and to be depressed by the latter, a delivery device adapted to engage the pivoted lever, and a spring adapted to hold the lever up in position, all substantially as shown, whereby, when a coin is placed upon the lever, the latter will be depressed and thrown out of engagement with the delivery device.

2. In a vending-machine, the combination, with a casing provided with a coin-hopper, of a spring-sustained slotted lever pivoted to the case and provided with spring-arms to receive and hold the coin, a delivering device adapted to engage the pivoted lever when in its normal position, and an arm or rod connected with the delivering device, all substantially as shown, whereby, when a coin is placed on the lever, it causes the disengagement of the latter from the delivering device and permits the arm or rod carried by the latter to force the coin through the slotted lever.

3. In a vending apparatus, the combination, with the box or casing provided with a coin-hopper, a, of the slotted lever c, pivoted to the case, as at d, and provided with spring-arms f, to clasp the coin projecting through the slot in the lever, a hook, g, secured to the free end of the lever, a delivery-slide, h, provided with a hook, k, to engage the hook on the lever, and a spring, e, secured to the case and adapted to hold the lever c up in engagement with the hook on the delivery-slide.

In witness whereof I have hereunto set my hand in presence of two witnesses.

GUSTAV JOSEF DOLLINER.

Witnesses:
JOSEF STEINDECKER,
ENO GEO. BUCK.